(12) United States Patent
Finnie et al.

(10) Patent No.: US 7,302,533 B2
(45) Date of Patent: Nov. 27, 2007

(54) SYSTEM AND METHOD FOR OPTIMALLY CONFIGURING SOFTWARE SYSTEMS FOR A NUMA PLATFORM

(75) Inventors: James Liam Finnie, Aurora (CA); Taavi Andrew Burns, Toronto (CA); Matthew Albert Huras, Ajax (CA); Sunil Jeevananda Kamath, Markham (CA); Lan Tuong Pham, Markham (CA); Kevin R. Rose, Toronto (CA); Aamer Sachedina, Markham (CA); Roger Luo Quan Zheng, Richmond Hill (CA)

(73) Assignee: International Business Machines Corporation, Armonk, NY (US)

(*) Notice: Subject to any disclaimer, the term of this patent is extended or adjusted under 35 U.S.C. 154(b) by 329 days.

(21) Appl. No.: 11/077,579

(22) Filed: Mar. 11, 2005

(65) Prior Publication Data

US 2006/0206489 A1    Sep. 14, 2006

(51) Int. Cl.
G06F 12/00 (2006.01)
(52) U.S. Cl. ..................... 711/154; 711/148
(58) Field of Classification Search ............. 711/154, 711/148; 709/214
See application file for complete search history.

(56) References Cited

U.S. PATENT DOCUMENTS

| | | | |
|---|---|---|---|
| 5,784,697 A | 7/1998 | Funk et al. | 711/170 |
| 6,026,472 A | 2/2000 | James et al. | 711/147 |
| 6,275,907 B1 | 8/2001 | Baumgartner et al. | 711/143 |
| 6,389,513 B1 | 5/2002 | Closson | 711/129 |
| 6,434,656 B1 | 8/2002 | Downer et al. | 710/316 |
| 6,769,017 B1 * | 7/2004 | Bhat et al. | 709/214 |
| 6,871,219 B2 * | 3/2005 | Noordergraaf et al. | 709/214 |
| 2003/0014599 A1 | 1/2003 | McBrearty et al. | 711/148 |

OTHER PUBLICATIONS

Carey, Mike et al., "NSF Workshop on Industrial/Academic Cooperation in Database Systems," SIGMOD Record, vol. 28, No. 1, Mar. 1999, pp. 115-130.
Ohishi, Yukio et al., "Performance Evaluation of Two-Level Scheduling Algorithms for NUMA Multiprocessors," Systems and Computers in Japan. vol. 29, No. 2, 1998, pp. 36-46.
Reynolds, Paul F., Jr. et al., "Isotach Networks," IEEE Transactions on Parallel and Distributed Systems, vol. 8, No. 4, Apr. 1997, pp. 337-348.

\* cited by examiner

*Primary Examiner*—Hiep T. Nguyen
(74) *Attorney, Agent, or Firm*—Sawyer Law Group LLP

(57) ABSTRACT

A method and system for improving memory access patterns of software systems on NUMA systems discovers NUMA system resources where the NUMA system resources comprises a plurality of NUMA nodes; determines a plurality of database threads, processes, and objects for a database configuration; and generates a policy which assigns the plurality of database threads, processes, and objects to the plurality of NUMA nodes, wherein the generating of the policy is performed prior to initialization of the plurality of database threads, processes, and objects. The assignment of the database threads, processes, or objects to NUMA nodes is such that the amount of remote memory accesses is reduced. When the database thread, process, or object initializes, the database server queries the policy for its assigned NUMA node(s). The database thread, process, or object is then bound to the assigned NUMA node(s).

17 Claims, 4 Drawing Sheets

SYSTEM AND METHOD FOR OPTIMALLY CONFIGURING SOFTWARE SYSTEMS FOR A NUMA PLATFORM

FIELD OF THE INVENTION

The present invention relates to Non-Uniform Memory Access (NUMA) systems, and more particularly to the improvement of memory access patterns of software systems, including database servers, on NUMA systems.

BACKGROUND OF THE INVENTION

Non-Uniform Memory Access (NUMA) systems are known in the art. As illustrated in FIG. 1, with the NUMA architecture, a single system 101 is divided into several nodes 102, where each node is a grouping of one or more central processing units (CPU) 103 and some local memory 104. Memory access from a CPU in one NUMA node to memory in another NUMA node, i.e., a remote memory access, usually incurs a high penalty. The actual cost of a remote memory access varies depending on the hardware, but typically ranges from about 40% to 300% higher than local memory accesses. The operating system will try to ensure that most memory accesses from a single thread or process will be local. However, for software systems that have many threads or processes, and where memory is shared between different threads or processes, the operating system alone is not able to optimally distribute the threads, processes, and memory. Thus, a typical database server, for example, running on a NUMA system will suffer from making frequent remote memory accesses.

Accordingly, there exists a need for a method and system for improving memory access patterns of software systems on NUMA systems. Before the initialization of a software system, the method and system should create a policy for the binding of threads, processes, and memory objects to NUMA nodes such that memory access is optimized or significantly improved. The present invention addresses such a need.

SUMMARY OF THE INVENTION

A method and system for improving memory access patterns of a software system on NUMA systems discovers NUMA system resources, where the NUMA system resources comprises a plurality of NUMA nodes; determines a plurality of the software system threads, processes, and objects for a particular system configuration; and generates a policy which assigns the plurality of software system threads, processes, and objects to the plurality of NUMA nodes, wherein the generating is performed prior to initialization of the plurality of software system threads, processes, and objects. The assignment of the software system threads, processes, or objects to NUMA nodes is such that the amount of remote memory accesses is reduced. When the software system thread, process, or object initializes, the software system queries the policy for its assigned NUMA node(s). The software system thread, process, or object is then bound to the NUMA node(s) accordingly. In this manner, the costs from remote memory accesses are significantly reduced.

DETAILED DESCRIPTION

The present invention provides a method system, and computer readable medium encoded with a computer program for improving memory access patterns of software systems, and more particularly of a database server, on NUMA systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

In the method and system in accordance with the present invention, a policy is created prior to software system thread, process, or object initialization, which defines the placement of software system threads, processes, or objects on specific NUMA nodes. The assignment of the software system threads, processes, or objects to NUMA nodes is such that the amount of remote memory accesses is reduced. When the software system thread, process, or object initializes, the software system queries the policy for its assigned NUMA node(s). The software system thread, process, or object is then bound to the NUMA node(s) accordingly.

To more particularly describe the features of the present invention, please refer to FIGS. 2 through 4 in conjunction with the discussion below.

Figure 1:
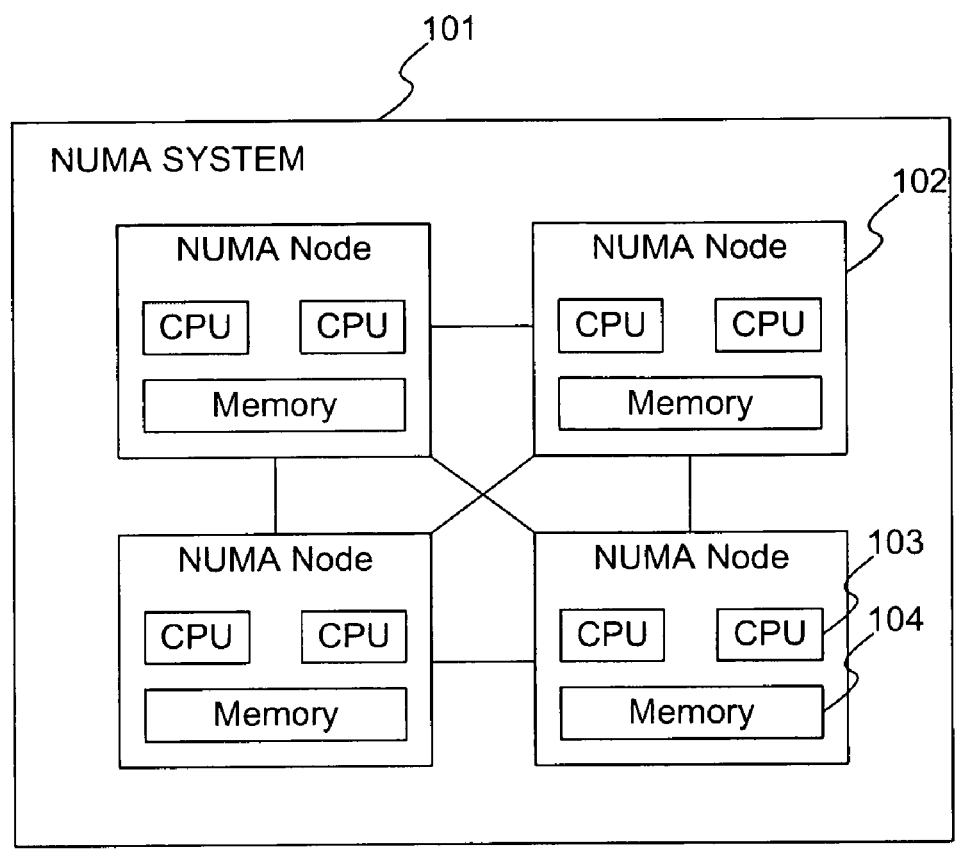
FIG. 1 illustrates a conventional Non-Uniform Memory Access (NUMA) architecture.
Figure 2:
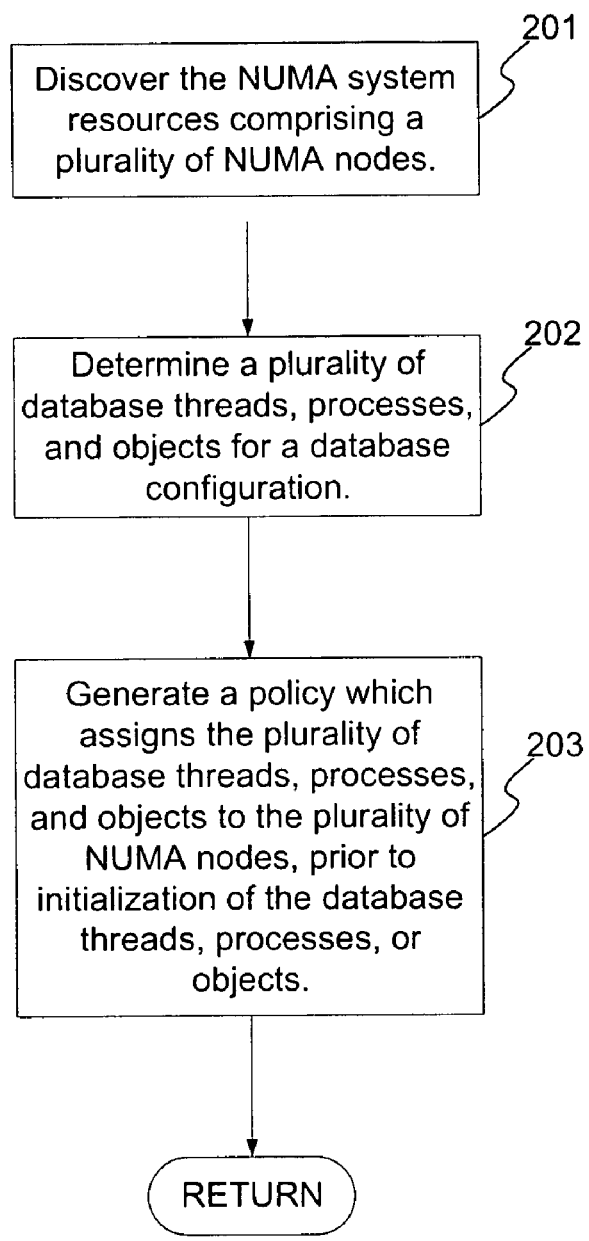
FIG. 2 illustrates a preferred embodiment of a method for improving memory access patterns of a database server on NUMA systems in accordance with the present invention.

FIG. 2 illustrates a preferred embodiment of a method for improving memory access patterns of a software system on NUMA systems in accordance with the present invention. Although the preferred embodiment is described below in the context of a database server, the database server is only one example of a software system that can benefit from reduced remote memory accesses using the present invention. The present invention can equally be applied to other software systems that are comprised of a plurality of threads, processes, or objects, and where memory is shared between the software system threads and/or processes. First, the NUMA system resources are discovered, where the resources comprises a plurality of NUMA nodes, via step 201. For example, the number of NUMA nodes in the system, and the amount of memory available on each node, can be discovered. Also, a plurality of database threads, processes, or objects for a database configuration is determined, via step 202. For example, the number and size of available buffer pools, the amount of memory to dedicate for row or table locks, etc. can be determined. Then, a policy is generated, which assigns the plurality of database threads, processes, and objects to the plurality of NUMA nodes, via step 203. Each database thread, process, or object can be assigned to a single NUMA node or across one or more NUMA nodes. The discovery, determination, and policy generation are performed prior to the initialization of the database threads, processes, or objects.

In the preferred embodiment, the policy assigns related database threads, processes, or objects to the same NUMA node. For example, a thread or process which services disk IO requests for a particular buffer pool is assigned to the same NUMA node that is assigned to the buffer pool object. The policy further assigns database objects so that the overall memory requirements of the entire database server are substantially evenly distributed across the NUMA system. Other manners of assigning the database threads, processes, or objects to improve memory access patterns are possible without departing from the spirit and scope of the present invention.

Figure 3:
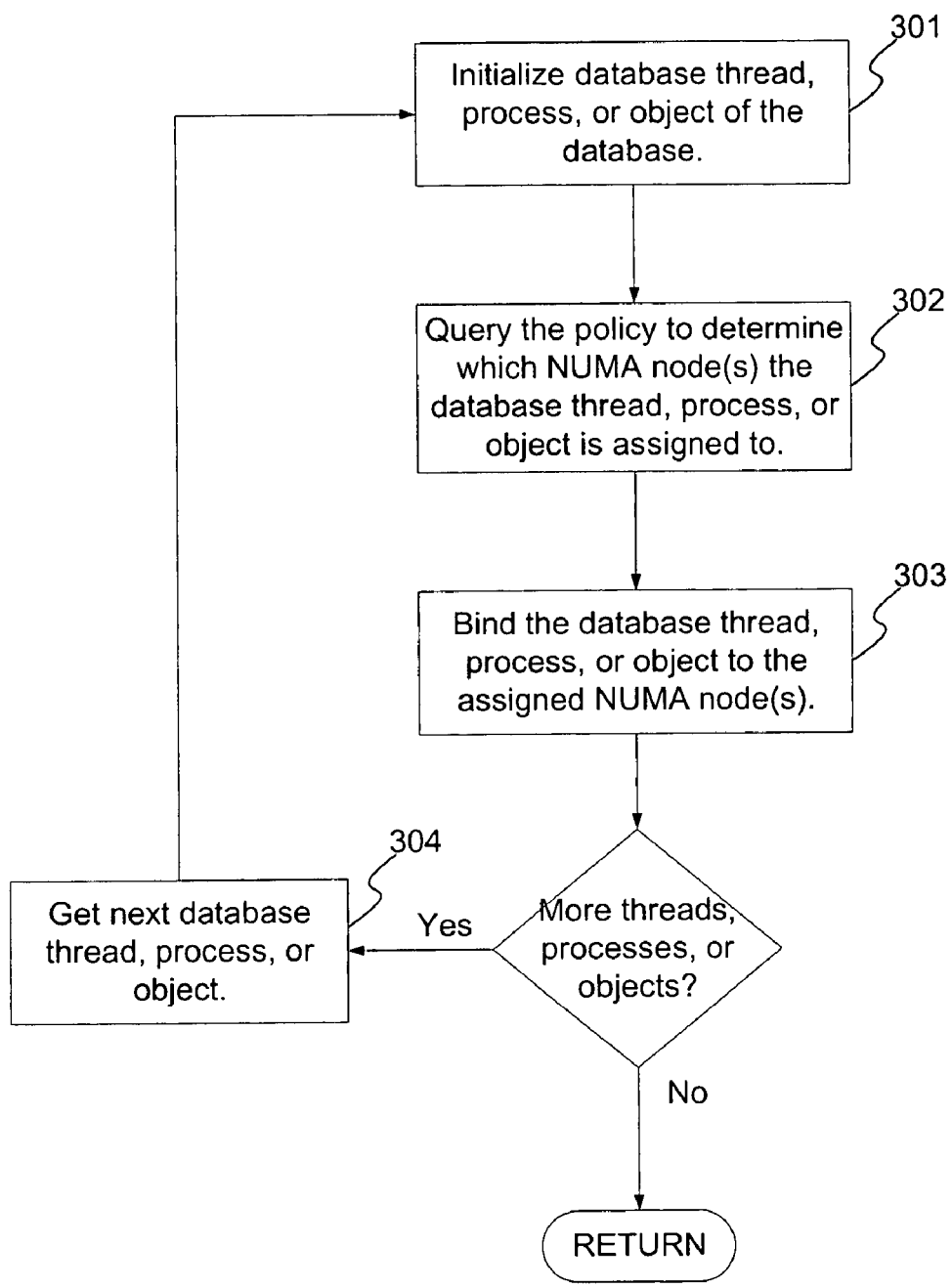
FIG. 3 is a flowchart illustrating a preferred embodiment of the implementation of the policy generated in accordance with the present invention.
Figure 4:
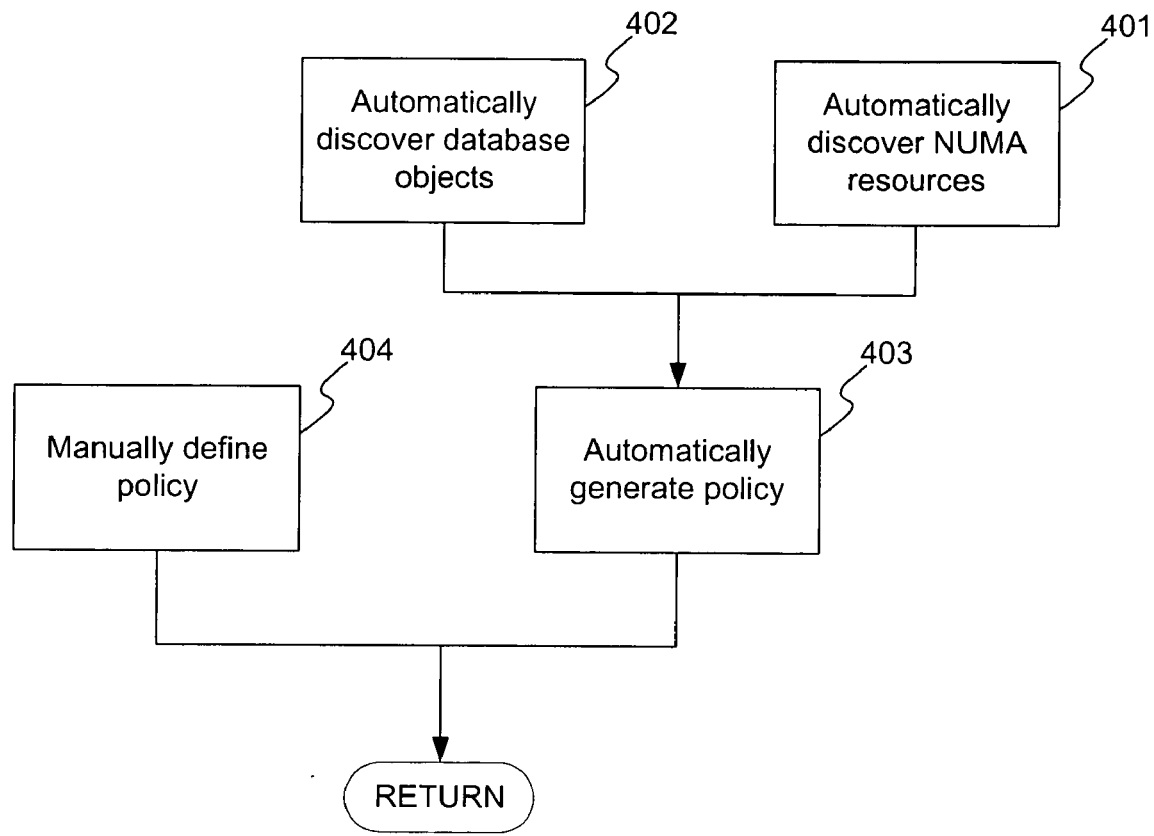
FIG. 4 is a flowchart illustrating the two manners of generating the policy.

FIG. 3 is a flowchart illustrating a preferred embodiment of the implementation of the policy generated in accordance with the present invention. After the policy is generated, as described above, one of the plurality of database threads, processes, or objects is initialized, via step 301. The policy is then queried to determine which NUMA node(s) the database thread, process, or object is assigned to, via step 302. In the preferred embodiment, each NUMA node has a unique identifier. This unique identifier is returned in response to the query. When process shared memory is allocated for the database, the policy is queried to determine how much memory is required from each NUMA node, and the process shared memory is distributed across the various NUMA nodes as needed. The database thread, process, or object is then bound to the assigned NUMA node(s), via step 303. If there are more database threads, processes, or objects to initialize, then the next database thread, process, or object is retrieved, via step 304, and steps 301 through 303 are repeated.

Creating the policy before any of the database threads, processes, or objects are initialized allows a more effective binding of database threads, processes, or objects. The amount of remote memory access by one NUMA node to another NUMA node can be significantly decreased.

In the preferred embodiment, the policy can be generated either automatically or manually (handcrafted). FIG. 4 is a flowchart illustrating the two manners of generating the policy. In automatically generating the policy, the NUMA resources are automatically discovered, via step 401. The number of nodes available in the NUMA system and the amount of memory available on each node are determined. Additionally, the database objects for a current database configuration are automatically discovered, via step 402. The policy 405 is then automatically generated for these NUMA resources and database objects, via step 403. In the preferred embodiment, the policy is generated by invoking an optimization routine, such that each database object is bound to a particular NUMA node and that the overall memory requirements of the entire database server are evenly distributed across the entire NUMA system. The optimization routine also distributes the database threads and/or processes such that, for example, a thread or process which services disk IO requests for a particular buffer pool will be bound to the same NUMA node that the buffer pool object is bound to. The policy can also support automatic reconfiguration in cases where new database objects or NUMA resources are added or removed.

Alternatively, the NUMA policy 405 is manually defined, via step 404. This manually defined policy would allow a user to fully specify how each database thread, process, and object is distributed. Depending on the particular workload, this policy can be very heavily optimized to ensure that, for example, all database application requests that operate on tables contained in a particular buffer pool are issued to a particular IPC port, which will spawn a database agent on the same NUMA node as the IPC port listener, and the IPC port listener will be bound to the same NUMA node as the buffer pool. This would ensure that all table memory accesses will be local.

A method and system for improving memory access patterns of a database server on NUMA systems have been disclosed. The method and system discovers NUMA system resources, where the NUMA system resources comprises a plurality of NUMA nodes; determines a plurality of database threads, processes, and objects for a database configuration; and generates a policy which assigns the plurality of database threads, processes, and objects to the plurality of NUMA nodes, wherein the generating is performed prior to initialization of the plurality of database threads, processes, and objects. The assignment of the database threads, processes, or objects to NUMA nodes is such that the amount of remote memory accesses is reduced. When the database thread, process, or object initializes, the database server queries the policy for its assigned NUMA node(s). The database thread, process, or object is then bound to the NUMA node(s) accordingly. In this manner, the costs from remote memory accesses are significantly reduced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for improving memory access patterns of a software system on a Non-Uniform Memory Access (NUMA) system, comprising:

discovering NUMA system resources, wherein the NUMA system resources comprises a plurality of NUMA nodes;

determining a plurality of software system threads, processes, and objects for a particular software system configuration; and generating a policy which assigns the plurality of software system threads, processes, and objects to the plurality of NUMA nodes, wherein the generating is performed prior to initialization of the plurality of software system threads, processes, and objects.

2. The method of claim 1, wherein the policy assigns related software system threads, processes, and objects to the same NUMA node.

3. The method of claim 1, wherein the policy assigns the software system threads, processes, and objects such that memory requirements for the software system are substantially evenly distributed across the plurality of NUMA nodes.

4. The method of claim 1, wherein the policy is automatically generated without user input.

5. The method of claim 1, wherein the policy is manually generated.

6. The method of claim 1, further comprising:

initializing one of the plurality of software system threads, processes, and objects;

querying the policy to determine which NUMA node the software system thread, process, or object is assigned to; and binding the software system thread, process, or object to the assigned NUMA node.

7. A system, comprising:
- a Non-Uniform Memory Access (NUMA) system comprising a plurality of NUMA nodes;
- a software system configuration comprising a plurality of threads, processes, and objects; and
- a means for generating a policy which assigns the plurality of software system threads, processes, and objects to the plurality of NUMA nodes, wherein the policy is generated prior to initialization of the plurality of software system threads, processes, and objects.

8. The system of claim 7, wherein the policy assigns related software system threads, processes, and objects to the same NUMA node.

9. The system of claim 7, wherein the policy assigns the software system threads, processes, and objects such that memory requirements for the software system are substantially evenly distributed across the plurality of NUMA nodes.

10. The system of claim 7, wherein the policy is automatically generated without user input.

11. The system of claim 7, wherein the policy is manually generated.

12. A computer readable medium encoded with a computer program for improving memory access patterns of a software system on a Non-Uniform Memory Access (NUMA) system, the computer program comprising computer executable instructions for:
- discovering NUMA system resources, wherein the NUMA system resources comprises a plurality of NUMA nodes;
- determining a plurality of software system threads, processes, and objects for a configuration; and
- generating a policy which assigns the plurality of software system threads, processes, and objects to the plurality of NUMA nodes, wherein the instructions for generating the policy is performed prior to initialization of the plurality of software system threads, processes, and objects.

13. The computer readable medium of claim 12, wherein the policy assigns related software system threads, processes, and objects to a same NUMA node.

14. The computer readable medium of claim 12, wherein the policy assigns the software system threads, processes, and objects such that memory requirements for the software system are substantially evenly distributed across the plurality of NUMA nodes.

15. The computer readable medium of claim 12, wherein the policy is automatically generated without user input.

16. The computer readable medium of claim 12, wherein the policy is manually generated.

17. The computer readable medium of claim 12, wherein the computer program further comprises computer executable instructions for:
- initializing one of the plurality of software system threads, processes, and objects;
- querying the policy to determine which NUMA node the software system thread, process, or object is assigned to; and
- binding the software system thread, process, or object to the assigned NUMA node.

* * * * *